United States Patent
Badri et al.

(10) Patent No.: US 12,553,902 B2
(45) Date of Patent: Feb. 17, 2026

(54) METHODS, KITS AND COMPOSITIONS FOR DIAGNOSING AND TREATING RENAL DISEASE

(71) Applicant: Hill's Pet Nutrition, Inc., Topeka, KS (US)

(72) Inventors: Dayakar Badri, Lawrence, KS (US); Dennis Jewell, Lawrence, KS (US)

(73) Assignee: Hill's Pet Nutrition, Inc., Overland Park, KS (US)

( * ) Notice: Subject to any disclaimer, the term of this patent is extended or adjusted under 35 U.S.C. 154(b) by 754 days.

(21) Appl. No.: 17/785,531

(22) PCT Filed: Dec. 16, 2019

(86) PCT No.: PCT/US2019/066608
§ 371 (c)(1),
(2) Date: Jun. 15, 2022

(87) PCT Pub. No.: WO2021/126158
PCT Pub. Date: Jun. 24, 2021

(65) Prior Publication Data
US 2023/0015727 A1    Jan. 19, 2023

(51) Int. Cl.
*G01N 33/68* (2006.01)
*B01L 3/00* (2006.01)

(52) U.S. Cl.
CPC ............ *G01N 33/6893* (2013.01); *B01L 3/50* (2013.01); *G01N 2800/345* (2013.01); *G01N 2800/50* (2013.01)

(58) Field of Classification Search
CPC ......... G01N 2800/345; G01N 2800/50; G01N 33/6893; B01L 3/50
See application file for complete search history.

(56) References Cited

U.S. PATENT DOCUMENTS

2019/0152907 A1*  5/2019  Zhang ................ A61P 13/12

FOREIGN PATENT DOCUMENTS

| CN | 109154610 A | 1/2019 |
|----|-------------|--------|
| JP | 2017-500844 | 1/2017 |
| WO | 2018/125029 | 7/2018 |

OTHER PUBLICATIONS

Pawlak et al., Kynurenine and its metabolites in the rat with experimental renal insufficiency, Journal of Physiology and Pharmacology, vol. 52, p. 755-766. (Year: 2001).*
Fildes, R.D., 1989, "Hereditary xanthinuria with severe urolithiasis occuring in infancy as renal tubular acidosis and hypercalciuria," Journal of Pediatrics, 115(2):277-280, DOI: 10.1016/S0022-3476(89) 80083-6.
Kario, K. et al., 1991, "Xanthine urolithiasis: Ultrastructure analysis of renal and bladder calculi," International Urology Nephrology, 23(4):317-323, DOI: 10.1007/BF02549601.
Duan et al., 2011, "Identification of biomarkers for melamine-induced nephrolithiasis in young children based on ultra high performance liquid chromatography coupled to time-of-flight mass spectrometry (U-HPLCQ-TOF/MS)", Journal of Chromatography B: Biomedical Sciences & Applications, Elsevier, 879 (30):3544-3550.
Gao et al., 2016, "Metabolomics analysis for hydroxy-L-proline-induced calcium oxalate nephrolithiasis in rats based on ultra-high performance liquid chromatography quadrupole time-of-flight mass spectrometry", Scientific Reports, 6(1):6.
International Search Report and the Written Opinion of the International Searching Authority issued in International Application PCT/US2019/066608 mailed Jul. 28, 2020.
Stevenson et al., 2004, "Nutrient Intake and Urine Composition in Calcium Oxalate Stone-Forming Dogs: Comparison with Healthy Dogs and Impact of Dietary Modification", Veterinary Therapeutics, Veterinary Learning Systems, 5(3):218-231.
Yang et al., 2009, "Multiple screening of urolithic organic acids with copper nanoparticle-plated electrode: Potential assessment of urolithic risks", Analytical Biochemistry, 395(2):224-230.

* cited by examiner

*Primary Examiner* — Adam Weidner
*Assistant Examiner* — Tiffany M Gough

(57) ABSTRACT

Methods and kits for assessing the propensity of developing urolithiasis, kidney disease, or bladder disease in pets; and compositions to treat such conditions are described herein.

7 Claims, No Drawings

METHODS, KITS AND COMPOSITIONS FOR DIAGNOSING AND TREATING RENAL DISEASE

CROSS-REFERENCE TO RELATED APPLICATION

This application is a U.S. National Stage application of International Application No. PCT/US2019/066608, filed Dec. 16, 2019, the contents of which are incorporated herein by reference in its entirety.

BACKGROUND

Renal disease is a common ailment in pets and a result of a variety of factors such as diet, genetics, metabolism breed, age and lifestyle. Urolithiasis, or kidney stones, is a pathological condition that is caused by a complex biochemical process which includes urine supersaturation, nucleation, crystal growth, crystal aggregation, crystal-cell interaction, crystal adhesion or retention and stone formation. Uroliths are classified and treated based on the type of mineral present in the composition such as oxalate, magnesium, ammonium or urate. While the organic stone matrix of urinary stones may contain lipids, GAGs, carbohydrates and proteins, there are only a few components that lead to the crystallization and stone formation.

The level of stone formation is dependent upon the level of imbalance between the inhibitors and promoters of stone formation. Inhibitors include small organic anions such as pyrophosphates, multivalent metallic cations such as magnesium and macromolecules such as proteins (glycoproteins, GAGs). Promoters include phospholipids, glycolipids, calcium, oxalate and low urinary volume. In addition, some lipids promote crystal nucleation, modulate growth and aggregation, and could become incorporated in growing calcifications.

Various metabolites may lead to the release of kidney stone promoters such as lipids, GAGs, and other stress related metabolites by damaging kidney epithelial cells through increasing kidney tissue inflammation, oxidative stress and injury. The increased release of promoters in urine would cause an imbalance between the inhibitors and promoters and thus created conditions in favor of stone formation.

Purine metabolism byproducts such as inosine and hypoxanthine are insoluble in urine and play a big role in inducing xanthinuria and kidney stone formation. Diets with appropriate essential fatty acids, limited minerals, high arginine, low tryptophan and optimal protein levels could alleviate kidney stone formation, particularly in individuals with comprised renal function. An effective treatment plan requires a multifaceted and directed plan which would rely heavily on a quantitative and qualitative analyses.

Current methods of diagnosis use a combination of clinical signs (e.g. hematuria, pollakiuria, strangury, and dysuria), blood tests such as a white blood cell count, imaging and urinalysis. Clinical signs are ineffective because many pets may be asymptomatic and the clinical signs are generally considered non-specific. In addition, blood tests may not reveal any abnormalities. Microscopic analysis of urine for crystal formation and pH analysis are effective but potentially time consuming and must be evaluated within a short time after collection. Imaging such as double-contrast cystography and ultrasounds are effective but a confirmatory test rather than diagnostic. Even after diagnosis, a pet requires chemical analysis for definitive and specific urolith diagnosis and treatment.

Thus, there is a need in the art for a non-invasive diagnostic methodology to assess the propensity of a pet to develop disease such as urolithiasis, kidney disease, or bladder disease.

BRIEF SUMMARY

Some embodiments of the present invention provide a method for diagnosing or identifying propensity of urolithiasis, kidney disease, or bladder disease. In certain embodiments, the diagnostic method comprises analyzing metabolites. Metabolites may be obtained from any bodily fluid and in the preferred embodiment the metabolite is obtained from urine. Further, the metabolites tested include but are not limited to, metabolites found in the tryptophan/kyneurenine, aminosugar, phosphatidylcholine, sphingolipid, and/or purine metabolic pathway.

Certain embodiments of the present invention are directed towards treating urolithiasis, kidney disease, or bladder disease in pets comprising administering a pet food composition comprising either high levels of arginine, low levels of tryptophan, and optimal amounts of protein or enhanced levels of essential fatty acids, controlled minerals and optimal amounts of protein.

Further embodiments of the present invention provide kits for diagnosing or identifying propensity of urolithiasis, kidney disease, or bladder disease in a companion animal.

DETAILED DESCRIPTION

The following invention relates in part to diagnostic methodology for assessing the propensity of renal disease in pets such as urolithiasis, kidney disease, and bladder disease.

The following description of the preferred embodiment(s) is merely exemplary in nature and is in no way intended to limit the invention. The description of illustrative embodiments is intended to be read in connection with the accompanying drawings, which are to be considered part of the entire written description. The following description of the preferred embodiment(s) is merely exemplary in nature and is in no way intended to limit the invention. The description of illustrative embodiments is intended to be read in connection with the accompanying drawings, which are to be considered part of the entire written description.

As used herein and in the appended claims, the singular forms "a", "an", and "the" include plural references unless the context dictates otherwise. The singular form of any class of the ingredients refers not only to one chemical species within that class, but also to a mixture of those chemical species; for example, the term "protein" in the singular form, may refer to a mixture of compounds each of which is also considered a protein. The terms "a" (or "an"), "one or more" and "at least one" may be used interchangeably herein. The terms "comprising", "including", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Unless otherwise defined, all technical and scientific terms and associated acronyms used herein have the same meaning as commonly understood by one of ordinary skill in the art. Further, it should be understood that the present invention is not limited to any particular method, protocol, and reagent described herein. The described methods, protocols, and reagents are merely examples and for illustration purposes only.

As used herein, the term "pet" could be used interchangeably with "companion animal" and refers to an animal of any species kept by a caregiver as a pet or any animal of a variety of species that have been widely domesticated as pets, including canines (Canis familiaris) and felines (Felis domesticus). Thus, a pet may include but is not limited to, working dogs, pet dogs, cats kept for rodent control (i.e. farm cats), pet cats, ferrets, birds, reptiles, rabbits, and fish.

Some embodiments of the present invention provide a method for diagnosing or identifying the propensity of renal disease in pets. In a preferred embodiment, the present invention provides a method for diagnosing or identifying the propsensity of urolithiasis, kidney disease, or bladder disease in pets. In certain embodiments, the diagnostic method comprises obtaining a biosample and quantifying biomarkers within the biosample.

As used herein, the term "IRIS" is used to refer to the stages or severity of chronic kidney disease (CKD) as commonly differentiated using the International Renal Interest Society guidelines. The guidelines create five different stages for CKD, from 'at risk' as the least severe stage to stage 4 or IRIS4 as the most severe.

As used herein, the term "biological sample" may be used interchangeably with the terms "sample," "specimen," "biomaterial" and "biological material." A biological sample refers to any organic material obtained from a pet including bodily fluids such as blood, saliva, and urine; tissue samples such as from a biopsy or fur; and other clinical specimens such as exhaled breath condensate. A biological sample could be obtained in a noninvasive and/or invasive manner. For example, a biological sample may be provided in such noninvasive ways as via a swabbing of a mouth, a collection of fur, or a urination. In other examples, a biological sample may be provided in such invasive ways as via a taking of blood via a needle or a removal of tissue via a biopsy.

In certain embodiments, the biological sample may further comprise one or more excipients. Excipients may be added to the biological sample at anytime. For example, an excipient may be added to the biological sample during collection, transportation, preparation and/or analysis of the sample.

The addition of excipients are well known in the art. Such excipients should be present in amounts that do not impair the purpose and effect provided by the invention. An excipient may be included as a stabilizer, preservative, processing aid, pH buffer, bulking agent, diluent, color reagent and dye. For example, ethylenediaminetetraacetic acid (EDTA) may be added to a biological sample during collection to preserve the biological sample.

Examples of excipients may include boric acid and derivatives thereof, dimethyl sulfoxide (DMSO), ethanol, polyethylene glycol, ethylenediaminetetraacetic acid (EDTA), formic acid and derivatives thereof, protease inhibitors, sodium salts such as sodium citrate and sodium metabisulfate, and protease inhibitors.

The detection of a disease, disorder, or other condition via a biological sample may enable point-of-care diagnosis for diseases, disorders, or other conditions. Methods to quantify one or more biomarkers within a biological sample are well known in the art (e.g. colorimetric reporting, nuclear magnetic resonance (NMR) spectroscopy, infrared (IR) spectroscopy, mass spectrometry, etc.). Although the disclosure may provide many examples relating to urine, it should be understood that such examples are for illustration purposes only. The examples may extend to any biological sample, including a bodily fluid or biological tissue.

As used herein, the term "biomarker" may be used interchangeably with "biological marker" and is used to refer to any measurable substance that could be used to examine organ function or any other biological state or condition. In certain embodiments, a biomarker may include a protein such as an immunoglobulin, a polynucleotide such as DNA and RNA, and a metabolite. In a preferred embodiment, the biomarker is a metabolic biomarker.

Detection and quantitation of biomarkers in a sample (such as urine) may be performed at any time after collection. For example, quantification of a biomarker within a biological sample may be performed within a short time period (e.g. within 2-minutes, within 5-minutes, etc.) or after a longer storage, transportation, preservation, or incubation phase (e.g. within 6 hours, within, 72 hours, etc.). In certain embodiments, the biological sample is stored, transported, or preserved at temperatures ranging about from about $-200°$ C. to about $30°$ C. For example, a urine sample is preferably stored, transported, and preserved at about $22°$ C. or $4°$ C. For another example, a tissue biopsy is preferably stored at $-20°$ C. for short term storage and $-80°$ C. for long term storage. It should be understood that these examples are for illustration purposes only and that the proper temperatures depend on the type of biological sample used in the present invention. The biological sample should be stored at the proper temperature for the specific type of biological sample as commonly understood by one of ordinary skill in the art.

One or more biomarkers within a sample may be used as a diagnostic tool for to any type of disease, disorder, or other condition. For example, one or more biomarkers may indicate a propensity (e.g., likelihood of developing) a pet may have for a disease, disorder, and/or condition. In a preferred embodiment, one or more biomarkers are used to diagnose or identify the propensity of urolithiasis, kidney disease, or bladder disease in pets. In an even more preferred embodiments, 30-60 biomarkers are used to diagnose or identify the propensity of urolithiasis, kidney disease, or bladder disease in pets.

Quantified metabolites may include but are not limited to, metabolites found in the tryptophan/kyneurenine, aminosugar, phosphatidylcholine, sphingolipid, and/or purine metabolic pathway.

Metabolites from the tryptophan/kyneurenine metabolic pathway may include tryptophan, N-acetyltryptophan, C-glycosyltryptophan, kynurenine, N-acetylkynurenine, kyurenate, anthranilate, 3-hydoxykynurenine, xanthurenate, and picolinate.

Metabolites from the aminosugar metabolic pathway may include fucose, glucoronate, diacetylchitobiose, N-acetylglucosamine 6-sulfate, N-acetylneuraminate, 3'-a-sialyl-N-acetyllactosamine, 6-sialyl-N-acetyllactosamine, N-acetylglucosaminylasparagine, erythronate, N-acetylglucosamine, N-acetylgalactosamine, and N-glycolylneuraminate Metabolites from the phosphatidylcholine metabolic pathway may include 1,2-dipalmitoyl, 1-palmitoyl-2-palmitoleoyl, 1-palmitoyl-2-oleoyl, 1-palmitoyl-2-arachidonoyl, 1-stearoyl-2-oleoyl, 1-stearoyl-2-linoleoyl, 1-stearoyl-2-arachidonoyl, 1-stearoyl-2-docosahexaenoyl, 1-oleoyl-2-linoleoyl, 1,2-dilinoleoyl.

Metabolites from the sphingolipid metabolic pathway may include palmitoyl dihydrosphingomyelin, palmitoyl sphingomyelin, stearoyl sphingomyelin, behenoyl sphingomyelin, tricosanoyl sphingomyelin, lignoceroyl sphingomyelin, and sphingomyelin.

Metabolites from the purine metabolic pathway may include inosine, hypoxanthine, xanthine, xanthosine, N1-methlinosine, urate, allantoin, allantoic acid, 1-methylhypoxanthine, adenine, 1-methyladenine, adenosine 5'-monophosphate, adenosine 3',5'-cyclic monophosphate, adenosine, N1-methylnadenosine, N6-methyladenosine, N6-carbamolthreonyladenosine, 2'desixtadenosine, N6-succinyladenosine, and 3-aminoisobutyrate.

Some embodiments of the present invention provide a method of identifying a companion animal at an increased likelihood of developing urolithiasis, comprising: analyzing a biological sample obtained from the companion animal for the presence of a tryptophan/kyneurenine pathway metabolite; an aminosugar pathway metabolite, a phosphatidylcholine pathway metabolite; a sphingolipid pathway metabolite and/or a purine pathway metabolite; wherein an elevated level of the tryptophan/kyneurenine pathway metabolite; the aminosugar pathway metabolite, the phosphatidylcholine pathway metabolite; the sphingolipid pathway metabolite and/or the purine pathway metabolite indicates that the companion animal has an increased likelihood of developing urolithiasis. In some embodiments, the tryptophan/kyneurenine pathway metabolite is selected from: C-glycosyltryptophan; kynurenine; kyurenate; anthranilate; 3-hydoxykynurenine; picolinate; and a combination of two or more thereof. In other embodiments, the tryptophan/kyneurenine pathway metabolite comprises 3-hydoxykynurenine.

In some embodiments, the aminosugar pathway metabolite is selected from: glucoronate; diacetylchitobiose; N-acetylglucosamine 6-sulfate; N-acetylneuraminate; 3'-asialyl-N-acetyllactosamine; 6-sialyl-N-acetyllactosamine; N-acetylglucosaminylasparagine; erythronate; N-glycolylneuraminate; and a combination of two or more thereof.

In some embodiments, the phosphatidylcholine pathway metabolite is selected from: 1,2-dipalmitoyl (16:0/16:0); 1-palmitoyl-2-oleoyl (16:0/18:1); 1-stearoyl-2-oleoyl (18:0/18:1); 1-stearoyl-2-linoleoyl (18:0/18:2); 1-stearoyl-2-arachidonoyl (18:0/20:4); 1-stearoyl-2-docosahexaenoyl (18:0/22:6); 1-oleoyl-2-linoleoyl (18:1/18:2); 1,2-dilinoleoyl (18:2/18:2); and a combination of two or more thereof.

In other embodiments, the sphingolipid pathway metabolite is selected from: palmitoyl dihydrosphingomyelin (d18:0/16:0); palmitoyl sphingomyelin (d18:1/16:0); stearoyl sphingomyelin (d18:1/18:0); behenoyl sphingomyelin (d18:1/22:0); lignoceroyl sphingomyelin (d18:1/24:0); sphingomyelin (d17:1/16:0, d18:1/15:0, d16:1/17:0); sphingomyelin (d18:1/20:0, d16:1/22:0); sphingomyelin (d18:1/24:1, d18:2/24:0); and a combination of two or more thereof.

In further embodiments, the purine pathway metabolite is selected from: inosine; hypoxanthine; N1-methylinosine; allantoin; allantoic acid; 1-methylhypoxanthine; adenine; 1-methyladenine; N1-methylnadenosine; N6-carbamoylthreonyladenosine; N6-succinyladenosine; 3-aminoisobutyrate; and a combination of two or more thereof.

Other embodiments of the present invention provide a method of delaying the onset and/or severity of urolithiasis in a companion animal, comprising: detecting in a biological sample from a companion animal, an aberrant level of a tryptophan/kyneurenine pathway metabolite; an aminosugar pathway metabolite, a phosphatidylcholine pathway metabolite; a sphingolipid pathway metabolite and/or a purine pathway metabolite; and administering to the companion animal a composition comprising an effective amount of arginine. In some embodiments, the aberrant level is greater than the level of metabolite found in a healthy companion animal.

In some embodiments, the companion animal is selected from a canine and a feline. In some embodiments, the companion animal is a feline.

Yet other embodiments provide a method for identifying a feline subject at an increased risk of developing urolithiasis, comprising: (a) detecting in a biological sample obtained from the feline subject the presence of a tryptophan/kyneurenine pathway metabolite; an aminosugar pathway metabolite, a phosphatidylcholine pathway metabolite; a sphingolipid pathway metabolite and/or a purine pathway metabolite; (b) determining a metabolic signature for urolithiasis for the feline subject by, (b1) classifying the feline subjects using partial least squares-discriminant analysis (PLS-DA) as healthy or stone formers according to the levels of tryptophan/kyneurenine pathway metabolite; an aminosugar pathway metabolite, a phosphatidylcholine pathway metabolite; a sphingolipid pathway metabolite and/or a purine pathway metabolite detected in step (a); (b2) calculating the ratio of metabolites found in the stone formers to healthy feline subjects to determine a metabolic profile for the feline subject; (c) comparing the feline subject's metabolic profile calculated in (b2) to reference metabolic profiles to identify the risk the feline subject has for urolithiasis, wherein the reference metabolic profiles are determined by a distribution analysis of profiles from a population of felines that includes healthy feline subjects and felines diagnosed as stone formers in which cut-off ranges are established corresponding to relative levels of risk; and (d) identifying the feline subject as having a metabolic signature for urolithiasis when the metabolic profile corresponds to an elevated level of risk for urolithiasis.

In some embodiments, the biological sample is selected from: urine; saliva; tissue; sweat; and hair.

Still further embodiments provide a kit for identifying a companion animal having an increased risk for developing urolithiasis, comprising: a vessel for collecting a biological sample;

a detection method selected from: ELISA, chromatographic analysis (e.g. TLC and HPLC), fluorescence tags or stains specific to the combination of two or more metabolites thereof; point of care testing devices with preloaded chromophores/antibodies specific to the combination of one or two or more metabolites described herein; and instructions for use.

In some embodiments, the detection method is configured to evaluate the presence of a tryptophan/kyneurenine pathway metabolite; an aminosugar pathway metabolite, a phosphatidylcholine pathway metabolite; a sphingolipid pathway metabolite and/or a purine pathway metabolite in a test animal. In other embodiments, the instructions for use instruct the clinician to compare the presence of a metabolite in the test animal to the presence of a metabolite in a reference animal. In some embodiments, the reference animal is a healthy animal. In further embodiments, the animal is a companion animal.

In some embodiments, when a greater level of the metabolite is detected in the test animal when compared to the presence of that metabolite in a reference animal, the test animal has an increased likelihood of developing urolithiasis.

In some embodiments, the present invention is a pet food composition used to treat any of the disease states or conditions described herein. In a preferred embodiment, the present invention is a method for treating urolithiasis, kidney disease, or bladder disease in pets comprising administering a pet food composition. Preferably, the pet food composition comprises high levels of arginine, low levels of tryptophan, and optimal amounts of protein.

The pet food composition may be in the form of a kibble. In other embodiments, the pet food composition is in the form of multi-layer kibble and/or a multi-layer kibble comprising a coating. Further, the coating could comprise a palatant. The term "palatability", as used herein, encompasses all the various properties of food sensed by animals such as texture, taste and aroma. In certain embodiments, the composition has a palatability equal to that of a control composition.

In certain embodiments, the kibble is formed by extrusion. In other embodiments, the composition is in a form selected from: a loaf, a stew, a "meat and gravy" form, a gruel, shreds with a moisture content greater than 50%", and a product that could be pushed through a syringe. In another embodiment, the present invention comprises 6% wt. to about 12% wt. moisture.

In some embodiments, the kibble may comprise a binder. In certain embodiments the binder includes but is not limited to any of the following or combinations of the following: monosaccharides such as glucose, fructose, mannose, arabinose; di- and trisaccharides such as sucrose, lactose, maltose, trehalose, lactulose; corn and rice syrup solids; dextrins such as corn, wheat, rice and tapioca dextrins; maltodextrins; starches such as rice, wheat, corn, potato, tapioca starches, or these starches modified by chemical modification; alginates, chitosans; gums such as carrageen, and gum arabic; polyols such as glycerol, sorbitol, mannitol, xylitol, erythritol; esters of polyols such as sucrose esters, polyglycol esters, glycerol esters, polyglycerol esters, sorbitan esters; sorbitol; molasses; honey; gelatins; peptides; proteins and modified proteins such as whey liquid, whey powder, whey concentrate, whey isolate, whey protein isolate, high lactose whey by-product, meat broth solids such as chicken broth, chicken broth solids, soy protein, and egg white.

In certain embodiments, the binder includes but is not limited to a lipid and/or lipid derivative. Lipids can be used in combination with water and/or other binder components. Lipids can include plant fats such as soybean oil, corn oil, rapeseed oil, olive oil, safflower oil, palm oil, coconut oil, palm kernel oil, and partially and fully hydrogenated derivatives thereof; animal fats and partially and fully hydrogenated derivatives thereof; and waxes.

In certain embodiments, the present invention may comprise additional ingredients including but not limited to, additives, minerals, vitamins, sources of carbohydrates, fat, protein, additional fiber, amino acids, carotenoids, antioxidants, fatty acids, glucose mimetics, probiotics, prebiotics, and others.

The pet food composition may contain additives known in the art. Such additives should be present in amounts that do not impair the purpose and effect provided by the invention. Examples of additives include substances with a stabilizing effect, organoleptic substances, processing aids, and substances that provide nutritional benefits.

Stabilizing substances may increase the shelf life of the composition. Suitable examples can include preservatives, antioxidants, synergists and sequestrants, packaging gases, stabilizers, emulsifiers, thickeners, gelling agents, and humectants. Examples of emulsifiers and/or thickening agents include gelatin, cellulose ethers, starch, starch esters, starch ethers, and modified starches.

Additives for coloring, palatability, and nutritional purposes can include colorants, salts (including but not limited to sodium chloride, potassium citrate, potassium chloride, and other edible salts), vitamins, minerals, and flavoring. The amount of such additives in a composition typically is up to about 5% by weight (on a dry matter basis of the composition). Other additives can include antioxidants, omega-3 fatty acids, omega-6 fatty acids, glucosamine, chondroitin sulfate, vegetable extracts, herbal extracts, etc.

In certain embodiments, the pet food composition comprises vitamins and minerals in amounts required to avoid deficiency and maintain health. These amounts are readily available in the art. The Association of American Feed Control Officials (AAFCO) provides recommended amounts of such ingredients for dogs and cats (see Association of American Feed Control Officials. Official Publication, pp. 126-140 (2003)). Minerals may specifically be maintained at optimum levels known by those skilled in the art to reduce the incidence of stone formation.

Vitamins could as an example include vitamin A, vitamin B1 (thiamine or related sources such as thiamine mononitrate), vitamin B2 (riboflavin), vitamin B3 (niacin), vitamin B5 (pantothenic acid or related sources such as calcium pantothenate), vitamin B6 (pyridoxine or related sources such as pyridoxine hydrochloride), vitamin B8 (folic acid), vitamin B12, vitamin C (ascorbic acid), vitamin D (such as a vitamin D3 supplements), vitamin E, vitamin H (biotin), vitamin K, acetate, choline and choline related sources such as choline chloride, and inositol.

Minerals and trace elements could as an example include calcium, phosphorus, sodium, potassium, magnesium, copper, zinc, choline, and iron salts. Mineral sources can include, for example, sodium selenite, monosodium phosphate, calcium carbonate, potassium chloride, ferrous sulfate, zinc oxide, manganese sulfate, copper sulfate, manganous oxide, potassium iodide, and/or cobalt carbonate.

The term "carbohydrate" as used herein includes polysaccharides (e.g., starches and dextrins) and sugars (e.g., sucrose, lactose, maltose, glucose, and fructose) that are metabolized for energy when hydrolyzed. Examples of high carbohydrate ingredients suitable for inclusion in the compositions disclosed herein include but are not limited to, corn, grain sorghum, wheat, barley, and rice.

In certain embodiments, the carbohydrate component comprises a mixture of one or more carbohydrate sources. Examples of carbohydrate or carbohydrate ingredients may comprise cereals, grains, corn, wheat, rice, oats, corn grits, sorghum, grain sorghum/milo, wheat bran, oat bran, amaranth, Durum, and/or semolina.

One skilled in the art could manipulate the texture of the final product by properly balancing carbohydrate sources. For example, short chain polysaccharides lend to be sticky and gluey, and longer chain polysaccharides are less sticky and gluey than the shorter chain; the desired texture of this hybrid food is achieved by longer chain polysaccharide and modified starches such as native or modified starches, cellulose and the like.

The carbohydrate mixture may additionally comprise optional components such as added salt, spices, seasonings, vitamins, minerals, flavorants, colorants, and the like. The amount of the optional additives is at least partially dependent on the nutritional requirements for different life stages of animals.

In some embodiments, the present invention may comprise about 5% wt. to about 25% wt. of fat. Sources of fats or fat ingredients, may comprise poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, and/or olestra.

In some embodiments, the present invention may comprise about 5% wt. to about 30% wt. of protein. The term "protein" means a polypeptide, or a peptide, or a polymer of amino acids. The term encompasses naturally occurring and non-naturally occurring (synthetic) polymers and polymers in which artificial chemical mimetics are substituted for one or more amino acids. The term also encompasses fragments, variants, and homologs that have the same or substantially the same properties and perform the same or substantially the same function as the original sequence. The term encompasses polymers of any length, including polymers containing from about 2 to 1000, from 4 to 800, from 6 to 600, and from 8 to 400 amino acids. The term includes amino acid polymers that are synthesized and that are isolated and purified from natural sources. Under some embodiments, the terms "polypeptide", "peptide" or "protein" are used interchangeably.

Protein may be supplied by any of a variety of sources known by those of ordinary skill in the art including plant sources, animal sources, microbial sources or a combination of these. For example, animal sources may include meat, meat-by products, seafood, dairy, eggs, etc. Meats, for example, may include animal flesh such as poultry fish, and mammals including cattle, pigs, sheep, goats, and the like. Meat by-products may include, for example, lungs, kidneys, brain, livers, stomachs and intestines. Plant protein includes, for example, soybean, cottonseed, and peanuts. Microbial sources may be used to synthesize amino acids (e.g., lysine, threonine, tryptophan, methionine) or intact protein such as protein from sources listed below.

Examples of protein or protein ingredients may comprise chicken meals, chicken, chicken by-product meals, lamb, lamb meals, turkey, turkey meals, beef, beef by-products, viscera, fish meal, enterals, kangaroo, white fish, venison, soybean meal, soy protein isolate, soy protein concentrate, corn gluten meal, corn protein concentrate, distillers dried grains, and/or distillers dried grain solubles and single-cell proteins, for example yeast, algae, and/or bacteria cultures.

The protein can be intact, completely hydrolyzed, or partially hydrolyzed. The protein content of foods may be determined by any number of methods known by those of skill in the art, for example, as published by the Association of Official Analytical Chemists in Official Methods of Analysis ("OMA"), method 988.05. The amount of protein in a composition disclosed herein may be determined based on the amount of nitrogen in the composition according to methods familiar to one of skill in the art.

Examples of amino acids may comprise 1-Tryptophan, Taurine, Histidine, Carnosine, Alanine, Cysteine, Arginine, Methionine, Tryptophan, Lysine, Asparagine, Aspartic acid, Phenylalanine, Valine, Threonine, Isoleucine, Histidine, Leucine, Glycine, Glutamine, Taurine, Tyrosine, Homocysteine, Ornithine, Citruline, Glutamic acid, Proline, and/or Serine. Sources of carotenoids may include lutein, astaxanthin, zeaxanthin, bixin, lycopene, and/or beta-carotene. Sources of antioxidant ingredients may comprise tocopherols (vitamin E), vitamin C, vitamin A, plant-derived materials, carotenoids (described above), selenium, and/or CoQ10 (Co-enzyme Q10). In a preferred embodiment, the pet food composition contains high levels of arginine and derivatives thereof and/or low levels of tryptophan and derivatives thereof. In another preferred embodiment, the pet food composition contains high levels of polyunsaturated fatty acids (e.g., alpha linolenic, arachidonic, EPA and DHA)

Examples of fatty acid ingredients may comprise arachidonic acid, alpha-linolenic acid, gamma linolenic acid, linoleic acid, eicosapentanoic acid (EPA), docosahexanoic acid (DHA), and/or fish oils as a source of EPA and/or DHA. Sources of glucose mimetics may comprise glucose antimetabolites including 2-deoxy Dglucose, 5-thio-D-glucose, 3-O-methylglucose, anhydrosugars including 1,5-anhydro-D-glucitol, 2,5-anhydro-D-glucitol, and 2,5-anhydro-D-mannitol, mannoheptulose, and/or avocado extract comprising mannoheptulose.

Still other ingredients may include beef broth, brewers dried yeast, egg, egg product, flax meal, DL methionine, amino acids, leucine, lysine, arginine, cysteine, cystine, aspartic acid, polyphosphates, sodium pyrophosphate, sodium tripolyphosphate; zinc chloride, copper gluconate, stannous chloride, stannous fluoride, sodium fluoride, triclosan, glucosamine hydrochloride, chondroitin sulfate, green lipped mussel, blue lipped mussel, methyl sulfonyl methane (MSM), boron, boric acid, phytoestrogens, phytoandrogens, genistein, diadzein, Lcarnitine, chromium picolinate, chromium tripicolinate, chromium nicotinate, acid/base modifiers, potassium citrate, potassium chloride, calcium carbonate, calcium chloride, sodium bisulfate; eucalyptus, lavender, peppermint, plasticizers, colorants, flavorants, sweeteners, buffering agents, slip aids, carriers, pH adjusting agents, natural ingredients, stabilizers, biological additives such as enzymes (including proteases and lipases), chemical additives, coolants, chelants, denaturants, drug astringents, emulsifiers, external analgesics, fragrance compounds, humectants, opacifying agents (such as zinc oxide and titanium dioxide), antifoaming agents (such as silicone), preservatives (such as butylated hydroxytoluene (BHT) and butylated hydroxyanisole (BHA), propyl gallate, benzalkonium chloride, EDTA, benzyl alcohol, potassium sorbate, parabens and mixtures thereof), reducing agents, solvents, hydrotropes, solubilizing agents, suspending agents (non-surfactant), solvents, viscosity increasing agents (aqueous and non-aqueous), sequestrants, and/or keratolytics.

The probiotic component may comprise any suitable bacteria, yeast, microorganisms, and/or mixtures of any thereof. Various probiotic microorganisms are known in the art. In certain embodiments, the probiotic component may comprise bacteria of the order *Lactobacillus*; bacteria of the genus *Bacillus, Bacteroides*, and/or *Bifidobacterium*; yeast of the order Saccharomycesles including the genus *Saccharomyces* and *Candida*; and/or mixtures of any thereof. The probiotic may or may not form a spore.

In certain embodiments, the pet food composition may include polyphenols. In some embodiments, the polyphenol source comprises a phenolic compound selected from ellagic acid; gallic acid; protocatechuic acid; p-hydroxybenzoic acid; catechin; and a combination of two or more thereof. In some embodiments, the polyphenol source comprises pecan shells, or any other component of the pecan nut. Examples of further sources of polyphenols may comprise tea extract, rosemary extract, rosemarinic acid, coffee extract, pecan shells, caffeic acid, turmeric extract, blueberry extract, grape extract, grapeseed extract, and/or soy extract The pet food composition may be determined by any of the variety of methods for feed analysis known by one skilled in the art. Feed analysis may be done to measure any of the nutritional content listed herein including moisture, protein, fiber, carbohydrate, energy, vitamin, mineral, energy, fat, and ash content.

Protein content may be measured and reported in any of the variety of methods known to one skilled in the art. Protein may be reported as crude protein (CP) to measure both true protein content and non-protein nitrogen. Crude protein content may be further differentiated between degradable intake protein (DIP), undegradable intake protein (UIP) and metabolizable protein (MP). In certain embodiments, protein content may be differentiated to include heat damaged protein or insoluble crude protein (ICP), adjusted crude protein (ACP), and digestible protein (DP).

Fiber content may be measured and reported in any of the variety of methods known to one skilled in the art. Fiber content may be reported as total dietary fiber (TDF, a combination of soluble and insoluble fiber) crude fiber (CF), neutral detergent fiber (NDF), acid detergent fiber (ADF) and/or acid detergent lignin (ADL). Crude fiber is generally known to estimate the indigestible portion of plant material found in pet food compositions. ADF measures cellulose and lignin, components of plant cell walls. NDF measures the total material found in plant cell walls and includes hemicellulose in addition to the fiber content measured as ADF. ADL measures only the lignin portion of a plant cell wall.

Energy content may be measured and reported in any of the variety of methods known to one skilled in the art. Energy content may be reported as digestible energy (DE), metabolizable energy (ME), net energy (NE), total digestible nutrient (TDN), ether extract (EE), relative feed value (RFV), and relative forage quality (RFQ).

Embodiments of the present invention will now be further described by way of the following, non-limiting, example.

Example

A total of 92 urine samples were collected from 43 cats. Urine was collected between one and three times from each cat during a 60-day period with collections spaced 30 days apart. Urine samples were partitioned with methanol and the resulting extract was divided into five aliquots.

Of the 43 cats, 9 cats were healthy, 7 cats were diagnosed as kidney stone formers, and 27 cats were diagnosed with stage 1 kidney disease ("IRIS1") as outlined by the International Renal Interest Society (IRIS) chronic kidney disease (CDK) guidelines. Cats in the IRIS1 designation had no diagnosis of kidney stones. The diagnosis of the cats was based on serum creatinine and symmetric dimethylarginine (SDMA) levels.

A non-targeted metabolomics analysis was performed on the frozen urine samples. Group comparisons were made by comparing group mean values for a given analyte. Classification of individuals as "healthy" or "stone former" was done using a partial least squares-discriminant analysis (PLS-DA) on the 60 tested metabolites. The PLS-DA analysis using the 60 metabolites had a classification accuracy of 92.4%.

The urine metabolomics analysis identified that five different metabolic pathway analytes were significantly increased in stone formers compared with healthy and IRIS1 cats. Specifically, the data described in Tables 1-5 (below) illustrates a clinically significant difference in metabolites from the tryptophan/kyneurenine, aminosugar, phosphatidylcholine, purine and sphingolipid metabolic pathway in urine between stone formers and healthy IRIS1 cats.

TABLE 1

| Metabolite | Stone Formers/ Healthy | IRIS1/ Healthy | IRIS1/ Stone Formers |
|---|---|---|---|
| Tryptophan | 1.27 | 1.06 | 0.83 |
| N-acetyltryptophan | 1.11 | 0.95 | 0.85 |
| G-glycosyltryptophan | 1.51** | 1.09 | 0.72** |
| Kynurenine | 1.88** | 1.17** | 0.62** |
| N-acetylkynurenine (2) | 1.49 | 0.98 | 0.66** |
| Kynurenate | 1.83** | 1.13 | 0.62** |
| Anthranilate | 1.9** | 1.35 | 0.71 |
| 3-hydroxykynurenine | 2.39** | 1.34 | 0.56** |
| Xanthurenate | 1.01 | 0.98 | 0.97 |
| Picolinate | 1.58** | 1.3** | 0.82** |

Table 1 (above) describes levels of metabolites in urine involved in tryptophan/kyneurenine metabolism. Numbers indicate the ratios (<1 or >1) between the groups as shown. Double asterisks ** indicate a clinically significant difference (p<0.5) between the groups.

TABLE 2

| Metabolite | Stone Formers/ Healthy | IRIS1/ Healthy | IRIS1/ Stone Formers |
|---|---|---|---|
| Fucose | 0.85 | 0.58 | 0.68 |
| Glucuronate | 1.74** | 1.22 | 0.7** |
| Diacetylchitobiose | 1.32** | 1.08 | 0.82 |
| N-acetylglucosamine 6-sulfate | 1.47** | 0.97 | 0.66** |
| N-acetylneuraminate | 1.39** | 1.1 | 0.79** |
| 3'-a-sialyl-N-acetyllactosamine | 1.57** | 1.13 | 0.72** |
| 6-sialyl-N-acetyllactosamine | 4.15** | 1.93** | 0.47 |
| N-acetylglucosaminylasparagine | 1.32** | 1.02 | 0.77** |
| Erythronate | 1.54** | 1.05 | 0.68** |
| N-acetylglucosamine/ N-acetylgalactosamine | 1.05 | 1.05 | 1 |
| N-glycolylneuraminate | 2.13** | 1.15 | 0.54** |

Table 2 (above) describes levels of metabolites in urine involved in aminosugar metabolism. Numbers indicate the ratios (<1 or >1) between the groups as shown. Double asterisks ** indicate a clinically significant difference (p≤0.5) between the groups.

TABLE 3

| Metabolite | Stone Formers/ Healthy | IRIS1/ Healthy | IRIS1/ Stone Formers |
|---|---|---|---|
| 1,2-dipalmitoyl-GPC (16:0/16:0) | 5.42** | 2.48** | 0.46 |
| 1-palmitoyl-2-palmitoleoyl-GPC (16:0/16:1)* | 1.51 | 1.77 | 1.17 |
| 1-palmitoyl-2-oleoyl-GPC (16:0/18:1) | 4.32* | 2.04 | 0.47 |
| 1-palmitoyl-2-arachidonyl-GPC (16:0/20:4n6) | 6.1 | 2.78 | 0.46 |
| 1-stearoyl-2-oleoyl-GPC (18:0/18:1) | 8.96** | 3.43** | 0.38** |
| 1-stearoyl-2-linoleoyl-GPC (18:0/18:2)* | 8.44** | 3.41 | 0.4** |
| 1-stearoyl-2-arachidonyl-GPC (18:0/20:4) | 19.09** | 5.97 | 0.31** |
| 1-stearoyl-2-docosahexaenoyl-GPC (18:0/22:6) | 14.59** | 2.96** | 0.2** |

TABLE 3-continued

| Metabolite | Stone Formers/ Healthy | IRIS1/ Healthy | IRIS1/ Stone Formers |
|---|---|---|---|
| 1-oleoyl-2-linoleoyl-GPC (18:1/18:2)* | 10.52** | 4.12 | 0.39** |
| 1,2-dilinoleoyl-GPC (18:2/18:2) | 2.01** | 1.42** | 0.7 |

Table 3 (above) describes fold levels of metabolites in urine involved in phosphatidylcholine metabolism. Numbers indicate the ratios (<1 or >1) between the groups as shown. Double asterisks ** indicate a clinically significant difference (p≤0.5) between the groups.

TABLE 4

| Metabolite | Stone Formers/ Healthy | IRIS1/ Healthy | IRIS1/ Stone Formers |
|---|---|---|---|
| Palmitoyl dihydrosphingomyelin (d18:0/16:0)* | 5.99** | 2.5** | 0.42 |
| Palmitoyl sphingomyelin (d18:1/16:0) | 2.57** | 1.53 | 0.6** |
| Stearoyl sphingomyelin (d18:1/18:0) | 2.08** | 1.26 | 0.61** |
| Behenoyl sphingomyelin (d18:1/22:0)* | 1.75** | 1.43 | 0.82 |
| Tricosanoyl sphingomyelin (d18:1/23:0)* | 1.95 | 1.5** | 0.77 |
| Lignoceroyl sphingomyelin (d18:1/24:0) | 3.04** | 2.05** | 0.68 |
| Sphingomyelin (d17:1/16:0, d18:1/15:0, d16:1/17:0)* | 2.93** | 1.74** | 0.6 |
| Sphingomyelin (d18:1/20:0, d16:1/22:0)* | 1.69* | 1.47 | 0.87 |
| Sphingomyelin (d18:1/24:1, d18:2/24:0) | 5.11** | 2.15 | 0.42** |

Table 4 (above) describes levels of metabolites in urine involved in sphingolipids metabolism. Numbers indicate the ratios (<1 or >1) between the groups as shown. Double asterisks ** indicate a clinically significant difference (p≤0.5) between the groups.

TABLE 5

| Metabolite | Stone Formers/ Healthy | IRIS1/ Healthy | IRIS1/ Stone Formers |
|---|---|---|---|
| Inosine | 3.34** | 1.35 | 0.4** |
| Hypoxanthine | 3.3** | 3.47** | 1.05** |
| Xanthine | 1.75 | 1.04 | 0.59 |
| Xanthosine | 1.05 | 0.98 | 0.93 |
| N1-methylinosine | 1.67** | 1.17 | 0.7** |
| Urate | 0.83 | 0.99 | 1.19 |
| Allantoin | 1.38** | 1.06 | 0.77** |
| Allantoic acid | 1.71** | 1.25** | 0.73** |
| 1-methylhypoxanthine | 1.57** | 0.95 | 0.61** |
| Adenosine 5'-monophosphate (AMP) | 1.93 | 2.07 | 1.07 |
| Adenosine 3',5'-cyclic monophosphate (cAMP) | 0.89 | 0.94 | 1.05 |
| Adenosine | 0.89 | 0.95 | 1.06 |
| Adenine | 1.65** | 1.02 | 0.61** |
| 1-methyladenine | 1.57** | 1.11 | 0.71** |
| N1-methyladenosine | 1.32** | 1.02 | 0.77** |
| N6-methyladenosine | 0.86 | 2.181 | 2.53** |
| N6-carbamoylthreonyladenosine | 1.57** | 1.21** | 0.77** |
| 2'-deoxyadenosine | 0.8 | 1.49 | 1.86** |
| N6-succinyladenosine | 1.43** | 1.11 | 0.78** |
| 3-aminoisobutyrate | 4.76** | 4.54** | 0.95 |

Table 5 (above) describes fold levels of metabolites in urine involved in purine metabolism. Numbers indicate the ratios (<1 or >1) between the groups as shown. Double asterisks ** indicate a clinically significant difference (p≤0.5) between the groups.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A method of identifying and treating a companion animal at an increased likelihood of developing urolithiasis, comprising:
    analyzing a biological sample obtained from the companion animal for the presence of a tryptophan/kynurenine pathway metabolite; an aminosugar pathway metabolite, a phosphatidylcholine pathway metabolite; a sphingolipid pathway metabolite and/or a purine pathway metabolite;
    wherein an elevated level of the tryptophan/kynurenine pathway metabolite; the aminosugar pathway metabolite, the phosphatidylcholine pathway metabolite; the sphingolipid pathway metabolite and/or the purine pathway metabolite indicates that the companion animal has an increased likelihood of developing urolithiasis; and
    administering to the companion animal a composition comprising an effective amount of (1) arginine; (2) polyunsaturated fatty acids, controlled minerals, and protein; or (3) palatability enhancers and viscous water.

2. The method according to claim 1, wherein the tryptophan/kynurenine pathway metabolite is selected from: C-glycosyltryptophan; kynurenine; kyurenate; anthranilate; 3-hydoxykynurenine; picolinate; and a combination of two or more thereof.

3. The method according to claim 2, wherein the tryptophan/kynurenine pathway metabolite comprises 3-hydoxykynurenine.

4. The method according to claim 1, wherein the companion animal is selected from a canine and a feline.

5. The method according to claim 1, wherein the companion animal is a feline.

6. The method according to claim 1, further comprising:
    (a) detecting in the biological sample obtained from the companion animal the presence of a tryptophan/kynurenine pathway metabolite; an aminosugar pathway metabolite, a phosphatidylcholine pathway metabolite; a sphingolipid pathway metabolite and/or a purine pathway metabolite;
    (b) determining a metabolic signature for urolithiasis for the companion animal by,
        (b1) classifying companion animals using partial least squares-discriminant analysis (PLS-DA) as healthy or stone formers according to the levels of tryptophan/kynurenine pathway metabolite; an aminosugar pathway metabolite, a phosphatidylcholine pathway metabolite; a sphingolipid pathway metabolite and/or a purine pathway metabolite detected in step (a);

(b2) calculating the ratio of metabolites found in the stone formers to healthy companion animals to determine a metabolic profile for the companion animal;
(c) comparing the companion animal's metabolic profile calculated in (b2) to reference metabolic profiles to identify the risk the companion animal has for urolithiasis, wherein the reference metabolic profiles are determined by a distribution analysis of profiles from a population of companion animals that includes healthy companion animals and companion animals diagnosed as stone formers in which cut-off ranges are established corresponding to relative levels of risk; and
(d) identifying the companion animal as having a metabolic signature for urolithiasis when the metabolic profile corresponds to an elevated level of risk for urolithiasis.

7. The method according to claim 1, wherein the biological sample comprises urine.

* * * * *